United States Patent
Tajima et al.

(10) Patent No.: US 6,952,057 B2
(45) Date of Patent: Oct. 4, 2005

(54) CONTROLLER OF VEHICLE

(75) Inventors: Yoichi Tajima, Anjo (JP); Yoshitaka Murase, Anjo (JP); Atsushi Kayukawa, Anjo (JP); Yukinori Nakamori, Anjo (JP); Yasuhiko Kobayashi, Anjo (JP)

(73) Assignee: Aisin Aw. Co., Ltd., Anjo (JP)

( * ) Notice: Subject to any disclaimer, the term of this patent is extended or adjusted under 35 U.S.C. 154(b) by 127 days.

(21) Appl. No.: 10/721,255

(22) Filed: Nov. 26, 2003

(65) Prior Publication Data

US 2004/0121882 A1 Jun. 24, 2004

(30) Foreign Application Priority Data

Dec. 20, 2002 (JP) ........................................ 2002-371009

(51) Int. Cl.$^7$ ............................. H02H 9/00; F02N 11/00
(52) U.S. Cl. ..................... 290/40 C; 318/255; 180/65.1
(58) Field of Search ............................. 290/40 R, 40 A, 290/40 C, 46; 322/14; 180/65.1, 65.2; 318/139, 255

(56) References Cited

U.S. PATENT DOCUMENTS

| | | | | |
|---|---|---|---|---|
| 5,730,094 A | * | 3/1998 | Morris ..................... | 123/192.1 |
| 6,093,974 A | * | 7/2000 | Tabata et al. ............. | 290/40 R |
| 6,166,517 A | * | 12/2000 | Wakashiro et al. ......... | 320/104 |
| 6,262,491 B1 | * | 7/2001 | Kitajima et al. .......... | 290/40 C |
| 6,314,346 B1 | * | 11/2001 | Kitajima et al. .............. | 701/22 |
| 6,362,536 B1 | * | 3/2002 | Izumiura et al. .......... | 290/40 C |
| 6,469,402 B2 | * | 10/2002 | Morimoto et al. ........ | 290/40 C |
| 6,492,741 B1 | * | 12/2002 | Morimoto et al. ........ | 290/40 C |
| 6,675,758 B2 | * | 1/2004 | Nagata et al. ........... | 123/192.1 |
| 6,898,505 B2 | * | 5/2005 | Kadota et al. ................ | 701/71 |

FOREIGN PATENT DOCUMENTS

JP    A 11-173147    6/1999

* cited by examiner

*Primary Examiner*—Nicholas Ponomarenko
(74) *Attorney, Agent, or Firm*—Oliff & Berridge, PLC (57) ABSTRACT

A controller of a vehicle for igniting, i.e., starting-up an engine on the basis of a load condition. When a starting condition judging device judges that the vehicle is advanced, i.e., starts moving, during an idle stop, an engine water temperature detector and a lubricating oil temperature detector of a load condition detector detect, e.g., the water temperature of the engine and the temperature of lubricating oil of an automatic speed change gear as a load condition having an influence on the magnitude of the load torque given to a motor. When an ignition condition setting device sets an ignition condition for starting the engine on the basis of the load condition and an ignition condition judging device judges that the ignition condition occurs, an engine ignition device ignites the engine. Thus, when the load with respect to the motor is large, the engine is ignited from low speed rotation and electric power consumption is reduced. In contrast to this, when the load is small, the engine is ignited by high speed rotation and the consumption of fuel is reduced. Thus, fuel cost of the vehicle is improved.

12 Claims, 7 Drawing Sheets

CONTROLLER OF VEHICLE

Priority is claimed from JP 2002-371009 filed Dec. 20, 2002, the disclosure of which is incorporated herein by reference thereto.

BACKGROUND OF THE INVENTION

For the purposes of this application, ignition, and variants thereof means the starting-up or initial cylinder firing of the vehicle and advancing, and variants thereof, means starting movement of the vehicle.

1. Field of Invention

The invention relates to a controller of a vehicle having an idle stop function, and particularly relates to the controller of a vehicle suitably used in a hybrid vehicle constructed by connecting a motor to the crank shaft of an engine, and more specifically changing ignition, or starting-up, timing of the engine on the basis of load torque given to the motor at an advancing, or start of vehicle movement, time after the idle stop.

2. Description of Related Art

For example, in the vehicle, such as the hybrid vehicle, etc., having the idle stop function, there is conventionally a structure for starting the engine by turning on injection and igniting, or starting-up, the engine after the vehicle is advanced by driving the motor and the engine is rotated in advancing the vehicle from a stopping state of the engine during the vehicle stoppage. JP-A-11-173174 (in particular columns 8–11, FIGS. 9, 10 and 11) provides an example of such.

When the engine is ignited, or initially started, in the state of low speed rotation, a relatively large torque is required to start the rotation of the engine. Accordingly, a large amount of fuel is used so that the amount of discharge gas is increased and has a bad influence on, e.g., an exhaust device, such as a muffler. Accordingly, there is a fear that the so-called emissions become worse. Therefore, in the vehicle having the idle stop function mentioned as above, it is desirable to ignite, or start-up, the engine after the rotation of the engine is raised to high speed rotation, as much as possible, by the motor as at the advancing time.

However, for example, when the engine has a low temperature (namely, the water temperature of the engine is low) and an automatic speed change gear has a low temperature (namely, the temperature of lubricating oil is low and the viscosity of the lubricating oil is high), etc., their dragging torques are large. Namely, the load torque with respect to the motor becomes large. Accordingly, when the engine and the automatic speed change gear are rotated by the motor in advancing the vehicle, a relatively large amount of electric power is consumed. Therefore, there is a fear that the improvement in fuel cost in the vehicle is prevented.

SUMMARY OF THE INVENTION

Therefore, an object of the invention is to provide a controller of the vehicle for solving the above problems by igniting, or starting-up, the engine on the basis of a load condition having an influence on the magnitude of the load torque given to the motor in advancing the vehicle by the motor.

An embodiment of the invention is a controller of a vehicle having an engine for outputting driving rotation by a crank shaft, a motor connected to the crank shaft of the engine, and a battery for supplying electric power to the motor, the controller of the vehicle including engine stopping means for freely stopping the operation of the engine at a stopping time of the vehicle, and motor control means for driving the vehicle and rotating the engine by controlling the driving of the motor at an advancing time of the vehicle, wherein the controller further includes load condition detecting means for detecting a load condition having an influence on the magnitude of load torque given to the motor during the stoppage of the engine when the vehicle is advanced by the motor; ignition condition setting means for setting an ignition, or start-up, condition for starting the engine on the basis of the load condition detected by the load condition detecting means; ignition condition judging means for judging that the ignition condition set by the ignition condition setting means is formed; and engine ignition means for igniting the engine on the basis of the judging result of the ignition condition judging means.

Further, the controller may include a rotation number detecting means for detecting the rotation number of the engine, and the ignition condition setting means sets an ignition starting rotation number of the engine as the ignition condition on the basis of the load condition, and the ignition condition judging means judges that the ignition condition is formed when the rotation number of the engine detected by the rotation number detecting means reaches the ignition starting rotation number.

Further, the ignition condition setting means may lowly set the ignition starting rotation number when the load torque given to the motor on the basis of a large load condition and highly set the ignition starting rotation number when the load torque given to the motor on the basis of a small load condition.

In the controller, the motor control means has rotation number control means for controlling the rotation number of the motor by setting a target rotation number at the advancing time of the vehicle, and the rotation number control means lowly sets the target rotation number when the load torque given to the motor is large.

In the controller of the vehicle as above, wherein the engine is a water cooling type engine, and the load condition detecting means has engine water temperature detecting means for detecting the water temperature of the water cooling type engine and detects the water temperature of the water cooling type engine as the load condition, and the ignition condition setting means sets the ignition condition on the basis of the water temperature of the water cooling type engine.

The controller may further include request torque detecting means for detecting the torque requested by a driver, and the ignition condition setting means sets the ignition condition on the basis of the water temperature of the water cooling type engine and the requested torque.

The controller as described above, wherein the vehicle includes an automatic speed change gear having a speed changing mechanism lubricated by lubricating oil and changing the speeds of driving rotations of the engine and the motor and outputting the changed speeds to a driving wheel, and the load condition detecting means has lubricating oil temperature detecting means for detecting the temperature of the lubricating oil of the automatic speed change gear, and detects the temperature of the lubricating oil of the automatic speed change gear as the load condition, and the ignition condition setting means sets the ignition condition on the basis of the temperature of the lubricating oil of the automatic speed change gear.

The controller of the vehicle as described above, wherein the controller further includes ignition condition correcting means for correcting the ignition condition set by the ignition condition setting means on the basis of a predetermined condition.

Further, the controller may include battery remaining amount detecting means for detecting the remaining charging amount of the battery, and the ignition condition correcting means corrects the ignition condition on the basis of the remaining charging amount of the battery detected by the battery remaining amount detecting means as the predetermined condition.

In addition, the controller of the vehicle may include battery performance detecting means for detecting a performance state of the battery, and the ignition condition correcting means corrects the ignition condition on the basis of the performance state of the battery detected by the battery performance detecting means as the predetermined condition.

The controller may also include battery temperature detecting means for detecting the temperature of the battery, and the ignition condition correcting means corrects the ignition condition on the basis of the temperature of the battery detected by the battery temperature detecting means as the predetermined condition.

The controller may further include external air temperature detecting means for detecting the external air temperature of the vehicle, and the battery temperature detecting means detects the temperature of the battery on the basis of the detection of the external air temperature detecting means.

In accordance with the described embodiment, the load condition detecting means detects the load condition having an influence on the magnitude of load torque given to the motor during the stoppage of the engine when the vehicle is advanced by the motor. The ignition condition setting means sets the ignition condition for starting the engine on the basis of the load condition. The ignition condition judging means judges that the ignition condition set by the ignition condition setting means is formed. The engine ignition means ignites the engine on the basis of the judging result of the ignition condition judging means. Accordingly, it is possible to set the timing for igniting the engine in accordance with the magnitude of the load torque given to the motor at the advancing time from the course of the engine stoppage. Therefore, emissions and fuel cost can be improved.

Additionally, the ignition condition setting means sets an ignition starting rotation number of the engine as the ignition condition, and the ignition condition judging means judges that the ignition condition is formed when the rotation number of the engine reaches the ignition starting rotation number. Accordingly, the timing for igniting the engine can be set on the basis of the actual engine rotation number.

Further, the ignition condition setting means lowly sets the ignition starting rotation number when the load torque given to the motor on the basis of the load condition is large, and highly sets the ignition starting rotation number when the load torque given to the motor on the basis of the load condition is small. Accordingly, when the load torque given to the motor is increased, the engine can be ignited by low speed rotation so that an increase in power consumption can be prevented. Thus, fuel cost can be improved. Further, when the load torque given to the motor is small, the engine can be ignited by high speed rotation so that emissions can be improved.

In addition, the rotation number control means lowly sets the target rotation number when the load torque given to the motor is large. Accordingly, power consumption can be restrained.

Further, the load condition detecting means detects the water temperature of the engine as the load condition, and the ignition condition setting means sets the ignition condition on the basis of the water temperature of the engine. Accordingly, the timing for igniting the engine can be set in accordance with the magnitude of the load torque given to the motor having an influence due to the temperature of the engine. Thus, emissions and fuel cost can be improved.

In accordance with the embodiment, the ignition condition setting means sets the ignition condition on the basis of the water temperature of the engine and the requested torque. Accordingly, the timing for igniting the engine can be set in accordance with the magnitude of the load torque given to the motor having the influence due to the temperature of the engine and the magnitude of the load torque given to the motor having an influence due to the requested torque. Thus, emissions and fuel cost can be further improved.

Additionally, the load condition detecting means detects the temperature of the lubricating oil of the automatic speed change gear as the load condition, and the ignition condition setting means sets the ignition condition on the basis of the temperature of the lubricating oil of the automatic speed change gear. Accordingly, the timing for igniting the engine can be set in accordance with the magnitude of the load torque given to the motor having an influence due to the temperature of the lubricating oil of the automatic speed change gear. Thus, emissions and fuel cost can be improved.

In the embodiment, the ignition condition correcting means corrects the ignition condition set by the ignition condition setting means on the basis of a predetermined condition. Accordingly, the set ignition timing of the engine can be changed on the basis of the predetermined condition.

Further, the ignition condition correcting means may correct the ignition condition on the basis of the remaining charging amount of the battery as the predetermined condition. Accordingly, the ignition timing of the engine can be changed in accordance with the remaining charging amount. Thus, for example, when the remaining charging amount of the battery is large, electric power is consumed by delaying the ignition timing of the engine. Further, for example, when the remaining charging amount of the battery is small, the ignition timing of the engine is hastened so that the consumption of the electric power can be restrained.

Additionally, the ignition condition correcting means corrects the ignition condition on the basis of the performance state of the battery as the predetermined condition. Accordingly, the ignition timing of the engine can be changed in accordance with the performance state of the battery. Thus, for example, when the performance state of the battery is bad, the ignition timing of the engine is hastened so that a reduction in voltage can be prevented.

The embodiment can also be such that the ignition condition correcting means corrects the ignition condition on the basis of the temperature of the battery as the predetermined condition. Accordingly, the ignition timing of the engine can be changed in accordance with the temperature of the battery. Thus, for example, when the temperature of the battery is low, the ignition timing of the engine is hastened so that electric power consumption is restrained. Thus, a voltage drop can be prevented. Additionally, the temperature of the battery can be detected by detecting the external air temperature of the vehicle.

BRIEF DESCRIPTION OF THE DRAWINGS

The invention will be described with reference to the drawings in which.

DETAILED DESCRIPTION OF PREFERRED EMBODIMENTS

Figure 1:
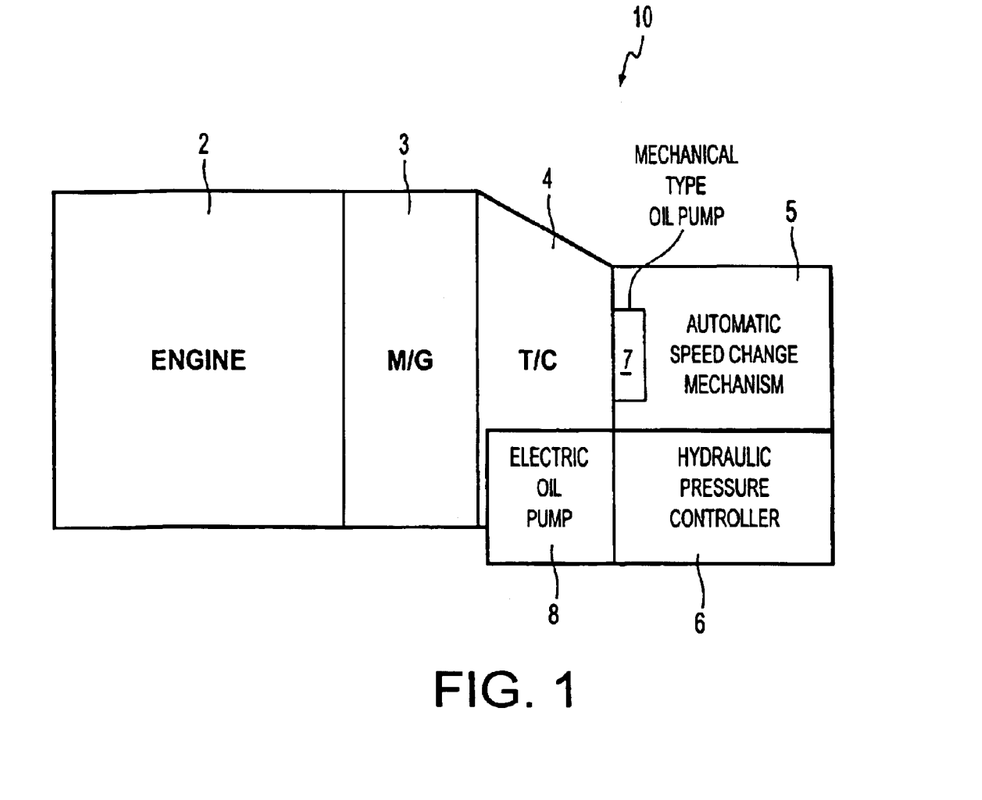
FIG. 1 is a block diagram showing the driving system of a vehicle in the invention.

The driving system of a vehicle able to apply the vehicle controller of the invention thereto will first be explained using FIG. 1. As shown in FIG. 1, a driving source includes an engine 2, of a water cooling type, and a motor-generator (M/G) (hereinafter simply called a "motor") 3. The driving source is connected such that the output rotation of the motor 3 is outputted to an output shaft connected to a crank shaft of the engine 2, i.e., such that the motor 3 is directly connected to the engine 2 in driving without any interposing elements, e.g., a clutch. The engine 2 and motor 3 driving rotations are outputted to an automatic speed change gear 10. The automatic speed change gear 10 comprises a torque converter (T/M) 4, an automatic speed change mechanism 5, a hydraulic pressure controller 6, a mechanical type oil pump 7, and an electric oil pump 8.

The automatic speed change mechanism 5 changes the speed of the inputted driving rotation on the basis of a vehicle running situation using a gear mechanism (or a gear mechanism and a belt type pulley), and outputs the changed speed to the driving wheel. Plural frictional engaging elements for changing the rotation speed are arranged in the automatic speed change mechanism 5. The hydraulic pressure controller 6 is used for changing the rotation speed by hydraulically controlling the engagement of the frictional engaging elements, and controlling the operation of the torque converter 4.

The mechanical type oil pump 7 and the electric oil pump 8 supply the hydraulic pressure to the hydraulic pressure controller 6. The mechanical type oil pump 7 works with the engine 2 (and the motor 3) and is operated by the rotation of the engine 2 to generate the hydraulic pressure in the hydraulic pressure controller 6. The electric oil pump 8 is arranged independently of the driving force of the engine 2 (and the motor 3), and is operated by a motor for the electric oil pump in which electric power is supplied from a battery (not shown). The electric oil pump 8 generates the hydraulic pressure in the hydraulic pressure controller 6 on the basis of the electric power (voltage).

When the hydraulic pressure in the hydraulic pressure controller 6 is generated by the mechanical type oil pump 7 and the electric oil pump 8, oil is supplied to the gear mechanism of the automatic speed change mechanism 5 as lubricating oil through the hydraulic pressure controller 6. The lubricating oil may be also directly supplied to the gear mechanism from the mechanical type oil pump 7 and the electric oil pump 8.

Figure 2:
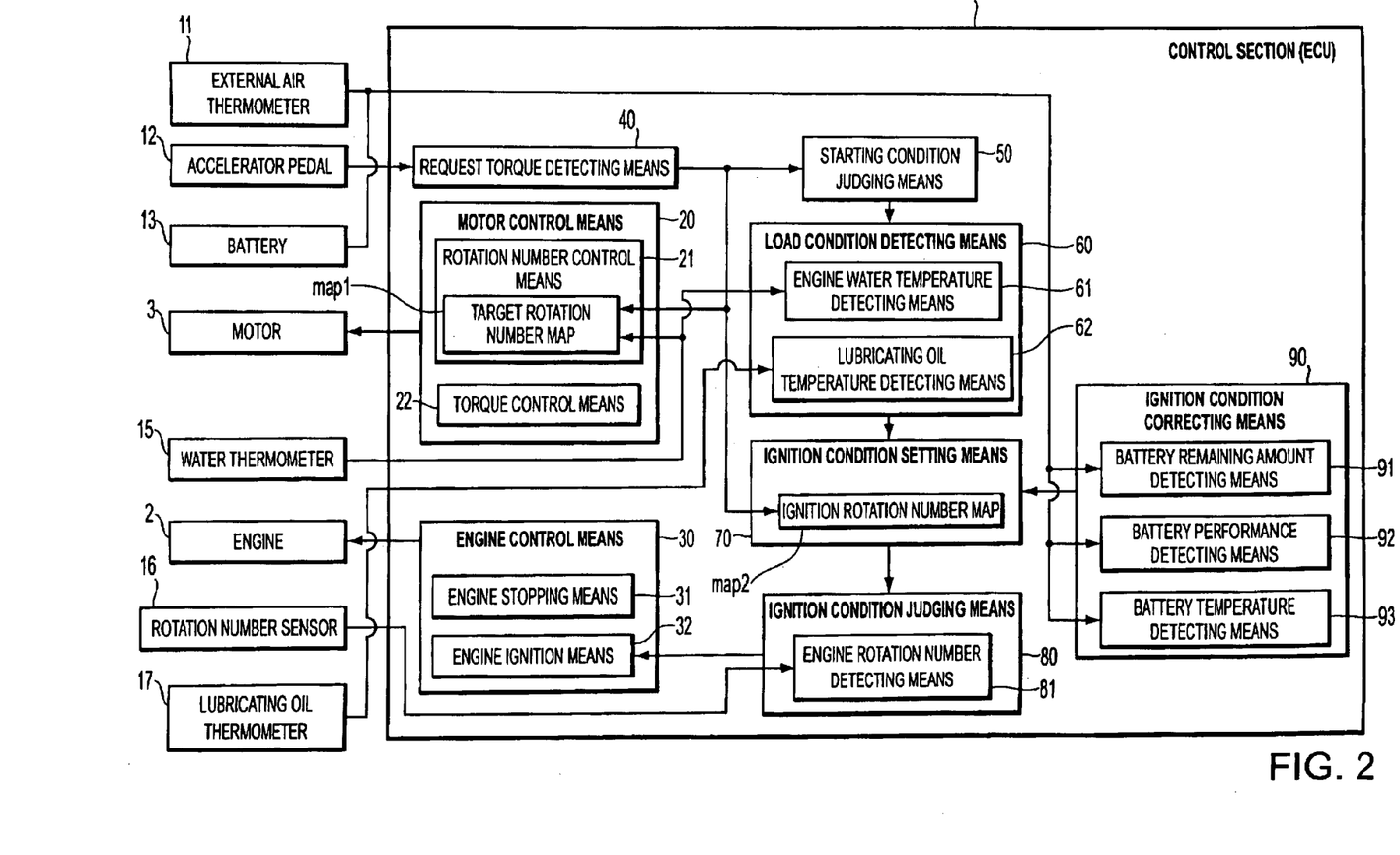
FIG. 2 is a block diagram showing a controller of the vehicle in the invention.

As shown in FIG. 2, the controller 1 of the vehicle in the invention has a motor control means 20 for controlling the operation of the motor 3, and an engine control means 30 for controlling the operation of the engine 2.

Figure 7:
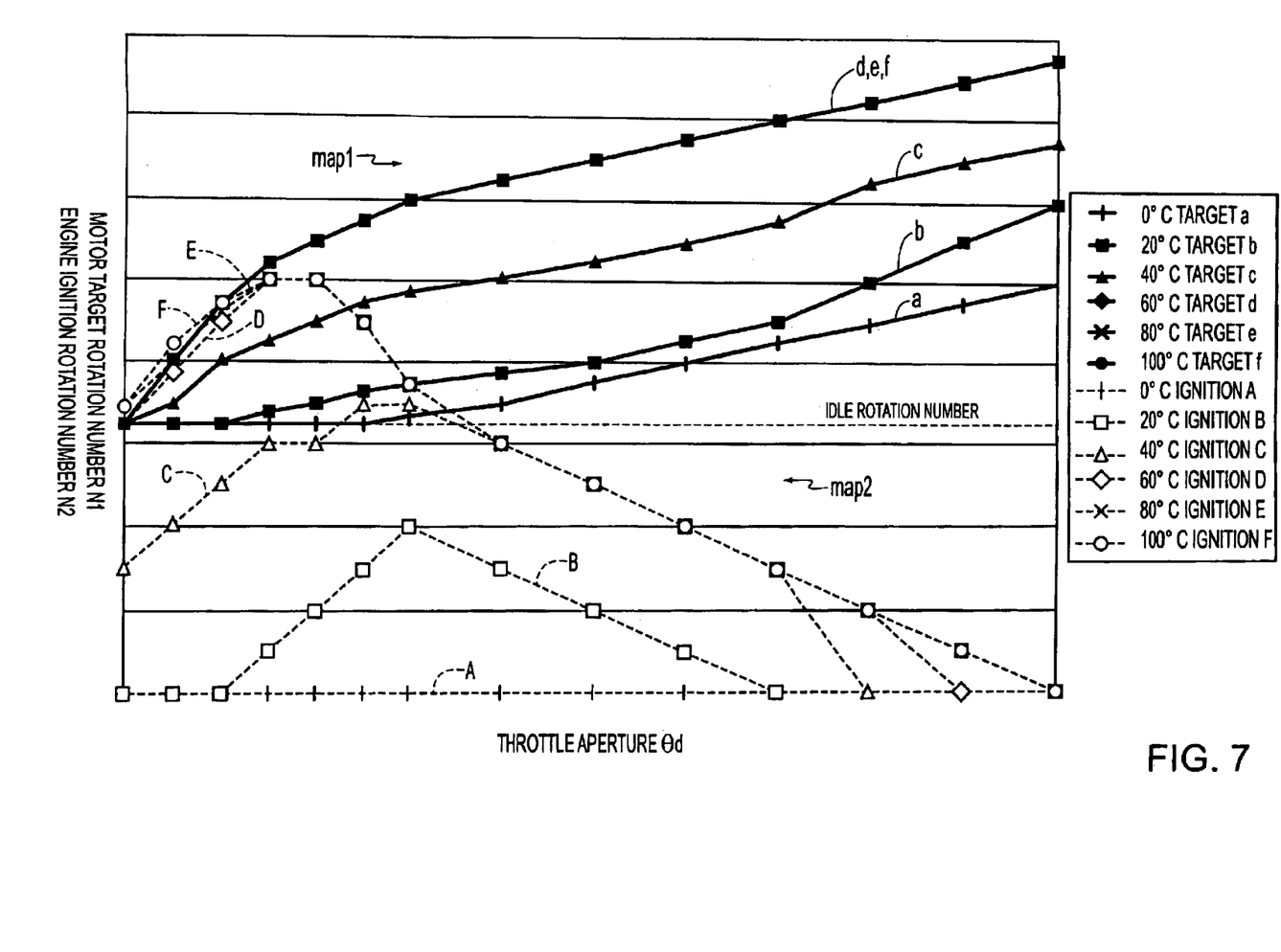
FIG. 7 is a view showing a target rotation number map and an ignition rotation number map.

The engine control means 30 has an engine stopping means 31 for freely stopping the operation of the engine 2, particularly at a stopping time of the vehicle, etc., and an engine igniting means 32 for igniting the engine 2, i.e., to start-up the engine 2. Thus, the engine control means 30 performs a so-called idle stop. The motor control means 20 has a rotation number control means 21 and a torque control means 22. The rotation number control means 21 controls the rotation number of the motor 3 by setting a target rotation number N1 on the basis of the water temperature and a throttle aperture θd of the engine 2, described later in detail, using a target rotation number map map1, as shown in FIG. 7, particularly at an advancing time, or start of movement, of the vehicle. The torque control means 22 controls the torque of the motor 3 in accordance with the required torque. The motor control means 20 freely performs driving control and regenerative control of the motor 3. At the idle stop time, the motor control means 20 advances the vehicle by controlling the driving of the motor 3, and rotates the engine 2 through the output shaft of the engine 2.

The controller 1 has a request torque detecting means 40 for detecting torque (throttle aperture θd) requested (requested torque) by a driver using an accelerator pedal 12 (or using a throttle aperture sensor (not shown)), a starting condition judging means 50 for judging that a condition for starting the engine 2 occurs, a load condition detecting means 60 for detecting a load condition having an influence on the magnitude of load torque applied to the motor 3 when the vehicle is advanced by the motor 3 at the idle stop time, an ignition condition setting means 70 for setting an ignition condition of the engine 2 on the basis of the detecting result of the load condition, an ignition condition judging means 80 for judging that the ignition condition occurs, and an ignition condition correcting means 90 for correcting the ignition condition on the basis of a predetermined condition.

The above load condition detecting means 60 has an engine water temperature detecting means 61 connected to a water thermometer 15 arranged, e.g., within a radiator of the engine 2, etc. The engine water temperature detecting means 61 detects the cooling water temperature of the engine 2, and also has a lubricating oil temperature detecting means 62 connected to a lubricating oil thermometer 17 arranged e.g., within the hydraulic pressure controller 6 of the automatic speed change gear 10, that detects the temperature of the lubricating oil of the automatic speed change gear 10. The load condition detecting means 60 detects the water temperature of the engine 2 and the temperature of the lubricating oil of the automatic speed change gear 10 as the load condition.

The ignition condition setting means 70 has an ignition rotation number map map2 as shown in FIG. 7. The ignition condition setting means 70 sets an ignition rotation number (ignition starting rotation number) N2 of the engine 2 as the ignition condition, using the ignition rotation number map map2, on the basis of the water temperature of the engine 2 detected as the load condition by the engine water temperature detecting means 61 and the throttle aperture θd detected by the request torque detecting means 40.

The ignition condition setting means 70 may also set the ignition rotation number N2 of the engine 2 on the basis of the temperature of the lubricating oil of the automatic speed change gear 10 detected by the lubricating oil temperature detecting means 62 as the load condition, and the throttle aperture θd detected by the request torque detecting means 40 from a map (not shown), etc., for example. Further, the ignition condition setting means 70 may also set the ignition rotation number N2 of the engine 2 on the basis of the water temperature of the engine 2, the temperature of the lubricating oil of the automatic speed change gear 10, and the throttle aperture θd as the load condition.

The ignition condition judging means 80 has an engine rotation number detecting means 81 connected to a rotation number sensor 16 associated with an output shaft (not shown) of the engine 2, for example, and detecting the rotation number of the engine 2. The ignition condition judging means 80 judges whether the actual engine rotation number Ne becomes the engine ignition rotation number N2 set by the ignition condition setting means 70, i.e., whether the ignition condition occurs. When the ignition condition occurs, the engine ignition means 32 turns on injection and ignites, i.e., starts-up, the engine 2.

The ignition condition correcting means 90 has a battery remaining amount detecting means 91, a battery performance detecting means 92 and a battery temperature detecting means 93. The battery remaining amount detecting means 91 is connected to a battery 13 for supplying electric power to the motor 3, and detects the remaining charge amount SOC of the battery 13. The battery performance detecting means 92 is similarly connected to the battery 13 for supplying the electric power to the motor 3, and detects a performance state SOH of the battery 13. The battery temperature detecting means 93 is connected to an external air thermometer (external air temperature detecting means) 11 arranged in, e.g., the car body, and detects the temperature of the battery 13 on the basis of the external air temperature. The ignition condition, i.e., the engine ignition rotation number N2 is corrected with the remaining charge amount SOC, the performance state SOH and the temperature of the battery 13. The performance state SOH of the battery 13 is a state of performance, such as oldness and newness of the battery 13, etc., caused by the degree of so-called exhaustion.

Figure 3:
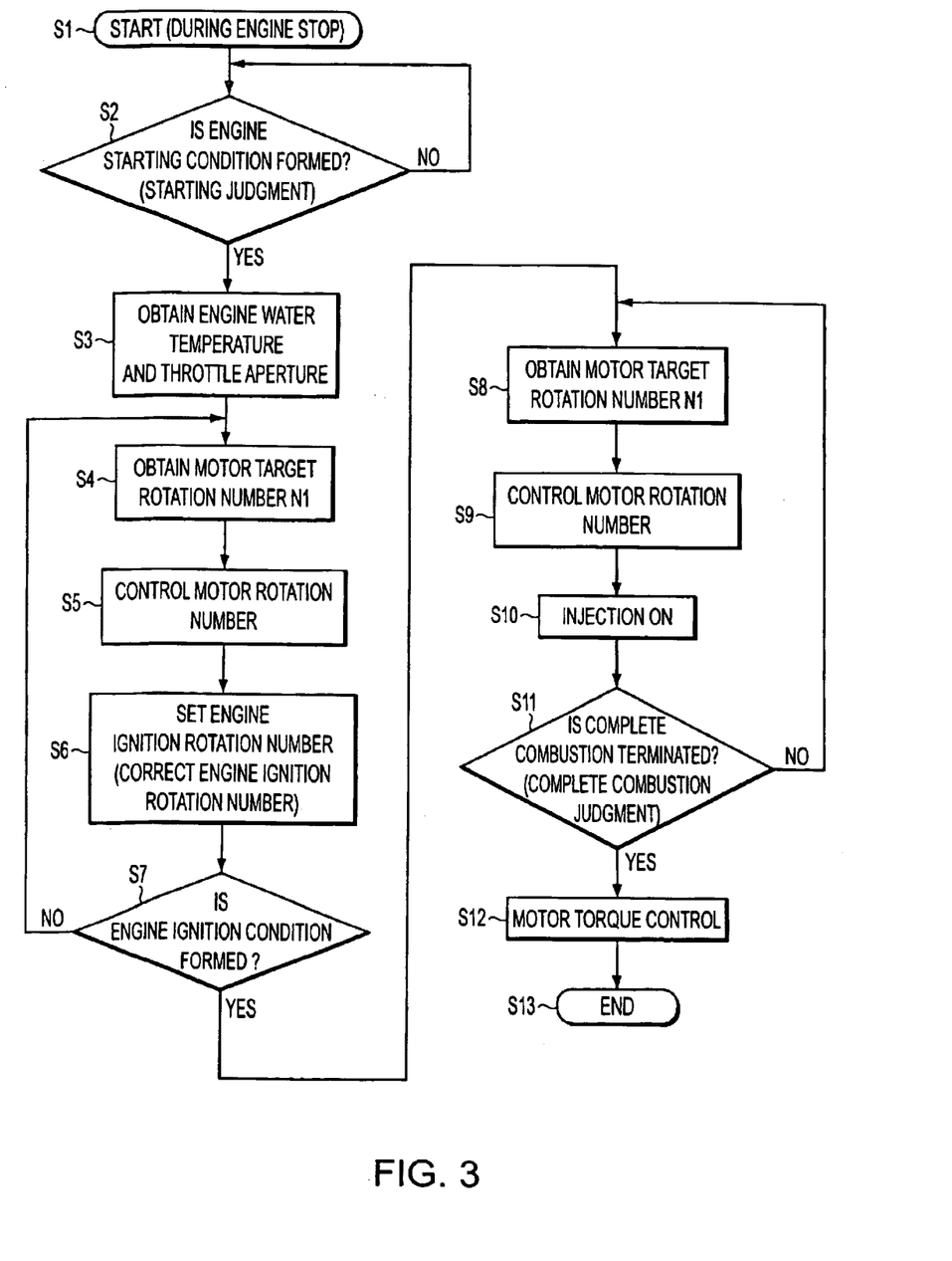
FIG. 3 is a flow chart showing engine starting control.

Next, the control of the controller 1 will be explained. As shown in FIG. 3, when engine starting control is started during an engine stop (S1), the starting condition judging means 50 judges brake OFF, throttle ON from the detection results of, e.g., the request torque detecting means 40, etc., and a vehicle speed of 0 or more from vehicle speed sensor (not shown), i.e., vehicle is stationary or is moving forward, for example, due to a slope or action of the motor 3. When one of these conditions occurs and an STT signal ON, from an ignition key (not shown), and an idle stop allowing signal ON, provided by a control section ECU, are judged as occurring, the starting condition judging means 50 judges that the engine starting condition occurs (starting judgment) (Yes in step S2). In contrast to this, when no engine starting condition occurs, the starting condition judging means 50 repeats the above operation until the engine starting condition occurs (No in step S2).

When the engine starting condition occurs, the engine water temperature detecting means 61 of the load condition detecting means 60 obtains (detects) the water temperature of the engine 2 from the water thermometer 15, and the request torque detecting means 40 obtains (detects) the throttle aperture θd from the accelerator pedal 12 (S3). The control process then proceeds to step S4.

At step S4, the water temperature of the engine 2, obtained from the water thermometer 15, and the throttle aperture θd, obtained from the request torque detecting means 40, are used by the rotation number control means 21 of the motor control means 20. Further, a motor target rotation number N1, as a target in rotating the motor 3, is obtained and set with reference to the target rotation number map map1 as shown in FIG. 7. As shown by lines a to f of FIG. 7, this motor target rotation number N1 is set to a high rotation number as the throttle aperture θd is increased, and is also set to a high rotation number as the water temperature of the engine 2 is raised. The rotation number control means 21 outputs rotation number commands to the motor 3 so as to attain the obtained motor target rotation number N1, and starts motor rotation number control (S5).

Next, when the motor rotation number control step S5 is started, it proceeds to step S6. In step S6, the ignition condition setting means 70 sets the engine ignition rotation number N2 for igniting the engine 2 with reference to the ignition rotation number map map2, as shown in FIG. 7, on the basis of the water temperature of the engine 2 and the throttle aperture θd obtained in step S3. As shown by broken lines A to F of FIG. 7, the engine ignition rotation number N2 is set based on the rotation number according to the throttle aperture θd, and is set to a higher rotation number based on an increase in the water temperature of the engine 2.

Further, in this case, the ignition condition correcting means 90 obtains (detects) the values of a voltage, an electric current, internal resistance, etc. from the battery 13, and the external air temperature from the external air thermometer 11. The battery remaining amount detecting means 91 detects the remaining charge amount SOC from the voltage value, the electric current value and the temperature of the battery 13. The battery performance detecting means 92 detects the performance state SOH from the internal resistance value. The battery temperature detecting means 93 detects the temperature of the battery 13 from the external air temperature. The ignition condition correcting means 90 makes a correction so as to raise the above engine ignition rotation number N2 (namely, so as to delay the ignition of the engine 2) in order to accelerate the consumption of electric power when the remaining charge amount SOC is high. The ignition condition correcting means 90 also makes a correction so as to reduce the engine ignition rotation number N2 (namely, so as to hasten the ignition of the engine 2) in order to prevent a reduction in voltage (to easily drop the voltage) when the performance state SOH is low (bad) and the temperature of the battery 13 is low.

The engine ignition rotation number N2 in this step S6 may be also set by obtaining the temperature of the lubricating oil of the automatic speed change gear 10, in step S3, and on the basis of the temperature of the lubricating oil and the throttle aperture θd. Further, the ignition rotation number N2 of the engine 2 may be also set on the basis of the water temperature of the engine 2, the temperature of the lubricating oil of the automatic speed change gear 10, and the throttle aperture θd.

When the engine ignition rotation number N2 is set in this way, the engine rotation number detecting means 81 of the ignition condition judging means 80 detects the actual engine rotation number Ne using the rotation number sensor 16. The ignition condition judging means 80 judges whether the engine ignition condition occurs by judging whether the actual engine rotation number Ne becomes the engine ignition rotation number N2, whether the above STT signal is turned on, and whether the above idle stop signal is turned on (S7). When the actual engine rotation number Ne does not reach the engine ignition rotation number N2 (No in step S7), the control returns to step S4 and steps S4 to S7 are repeated. In contrast to this, when the engine ignition condition is formed (Yes in step S7), it proceeds to step S8.

When the process proceeds to step S8, similar to step S4, the water temperature of the engine 2 obtained from the water thermometer 15 and the throttle aperture θd obtained from the request torque detecting means 40 are obtained by the rotation number control means 21. Further, the motor target rotation number N1, as a target for rotating the motor 3, is obtained and set with reference to the target rotation number map map1 as shown in FIG. 7. The rotation number control means 21 then outputs rotation number commands to the motor 3 to attain the obtained motor target rotation number N1, and continues the motor rotation number control (S9). Because the engine ignition condition is formed in the step S7, injection is turned on by the engine ignition means 32 (S10).

For example, when the engine 2 is started (ignited) and the rotation number is raised by the output torque from the engine 2, the rotation number control means 21 calculates the deviation of this raising rotation number and changes (lowers) the target rotation number. The rotation number control means 21 controls the motor rotation number so as to be converged to the initial target rotation number N1.

Thereafter, it proceeds to step S1 In step S1, it is judged whether the ignition of the engine 2 is terminated (namely, the engine 2 is independently running, i.e., requires no outside source to rotate the engine, such as the motor 3 during start-up) by the engine ignition means 32. When the engine 2 is not completely combusted, the control process returns to step S8, and steps S8 to S11 are repeated until the engine 2 is completely combusted (No in step S11). When it is judged that the engine 2 is completely combusted (Yes in step S11), it proceeds to step S12. The control of the motor 3 is then switched from the rotation number control using the rotation number control means 21 to torque control using the torque control means 22, and the engine starting control is terminated (S13).

Next, one example of the above control will be explained by dividing the engine water temperature into the cases of a low temperature (e.g., 20° C.), an ordinary temperature (e.g., 60° C.) and a high temperature (e.g., 80° C.). In the following explanation, the remaining charge amount SOC is an average charge amount, the performance state SOH is a normal state (i.e., a state in which there is no exhaustion), and the temperature of the battery 13 is set to an ordinary temperature.

Figure 4:
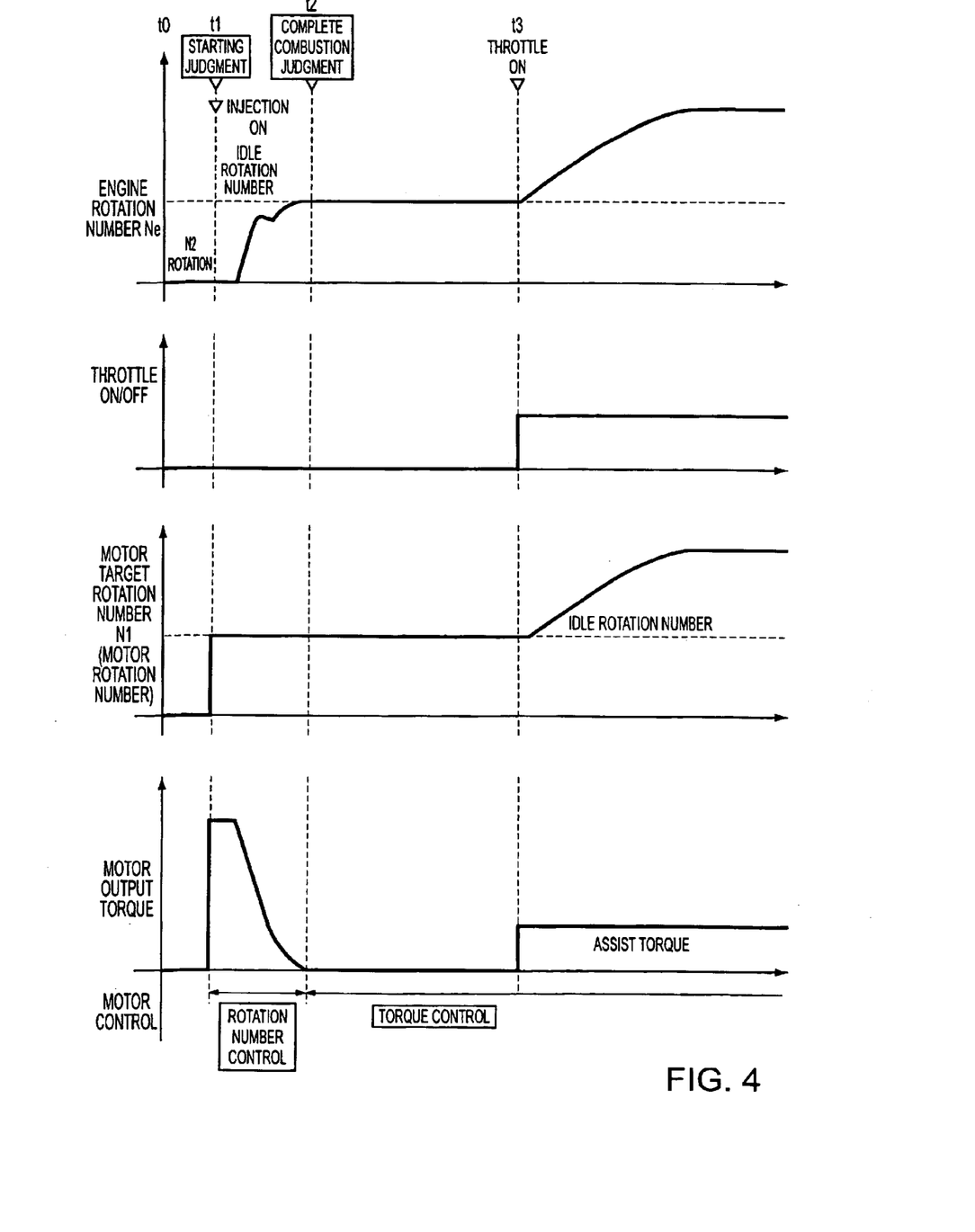
FIG. 4 is a time chart showing the case of a low temperature time of engine water.

First, the case of the low temperature, in which the engine water temperature is about 20° C., will be explained. As shown in FIG. 4, an idle stop (the engine is stopped) occurs at time point t0. For example, when the brake is released (throttle is turned off, i.e., it is closed) at a time point t1 and the engine starting condition is formed by the judgment of the starting condition judging means 50 (starting judgment in step S2), the water temperature of the engine 2 is obtained by the engine water temperature detecting means 61 and the throttle aperture θd is obtained by the request torque detecting means 40 (S3). For example, the water temperature of the engine 2 is found to be about 20° C., and the throttle aperture θd is found to be 0% (OFF). Accordingly, the motor target rotation number N1 is set to an idle rotation number by the rotation number control means 21 on the basis of line b of the target rotation number map map 1, shown in FIG. 7, (S4), and the rotation number of the motor 3 is controlled (S5).

Further, the engine ignition rotation number N2 is set to 0 by the ignition condition setting means 70 on the basis of line B of the ignition rotation number map map2 shown in FIG. 7 (S6). At the time point t1, the engine rotation number Ne is zero which is the engine ignition rotation number N2 (FIG. 4). Therefore, the engine ignition condition is formed by the judgment of the ignition condition judging means 80 (S7). Accordingly, while the rotation number control of the motor 3 is continued by the rotation number control means 21 (S8, S9), injection is immediately turned on by the engine ignition means 32 (S10).

When the motor 3 is thus driven by the rotation number control by means of the rotation number control means 21 at the time interval from the time point t1 to a time point t2, the vehicle is advanced, i.e., starts moving, and the engine 2 is rotated. Because the injection is turned on by the engine ignition means 32, the engine 2 is ignited, i.e., started-up. The motor 3 initially outputs maximum output torque during this time such that the rotation number of the motor 3 becomes the target rotation number N1. Thereafter, the output torque of the motor 3 is gradually lowered in accordance with the torque of the engine 2 outputted together with the starting of the engine 2. When the engine 2 is independently running at the time point t2 (complete combustion judgment in step S11), the motor 3 attains the state of torque control using the torque control means 22. However, the idle rotation number is maintained by the engine 2 and the torque is outputted from the engine 2. Accordingly, motor 3 outputs no torque and the vehicle attains the state of creep running by the engine 2.

When the throttle is turned on at a time point t3, assist torque is outputted by the motor 3 as a controlled torque (S12), and the engine 2 also outputs the torque according to the throttle aperture θd. Thus, the engine rotation number Ne and the motor rotation number are raised so that the vehicle is accelerated.

Figure 5:
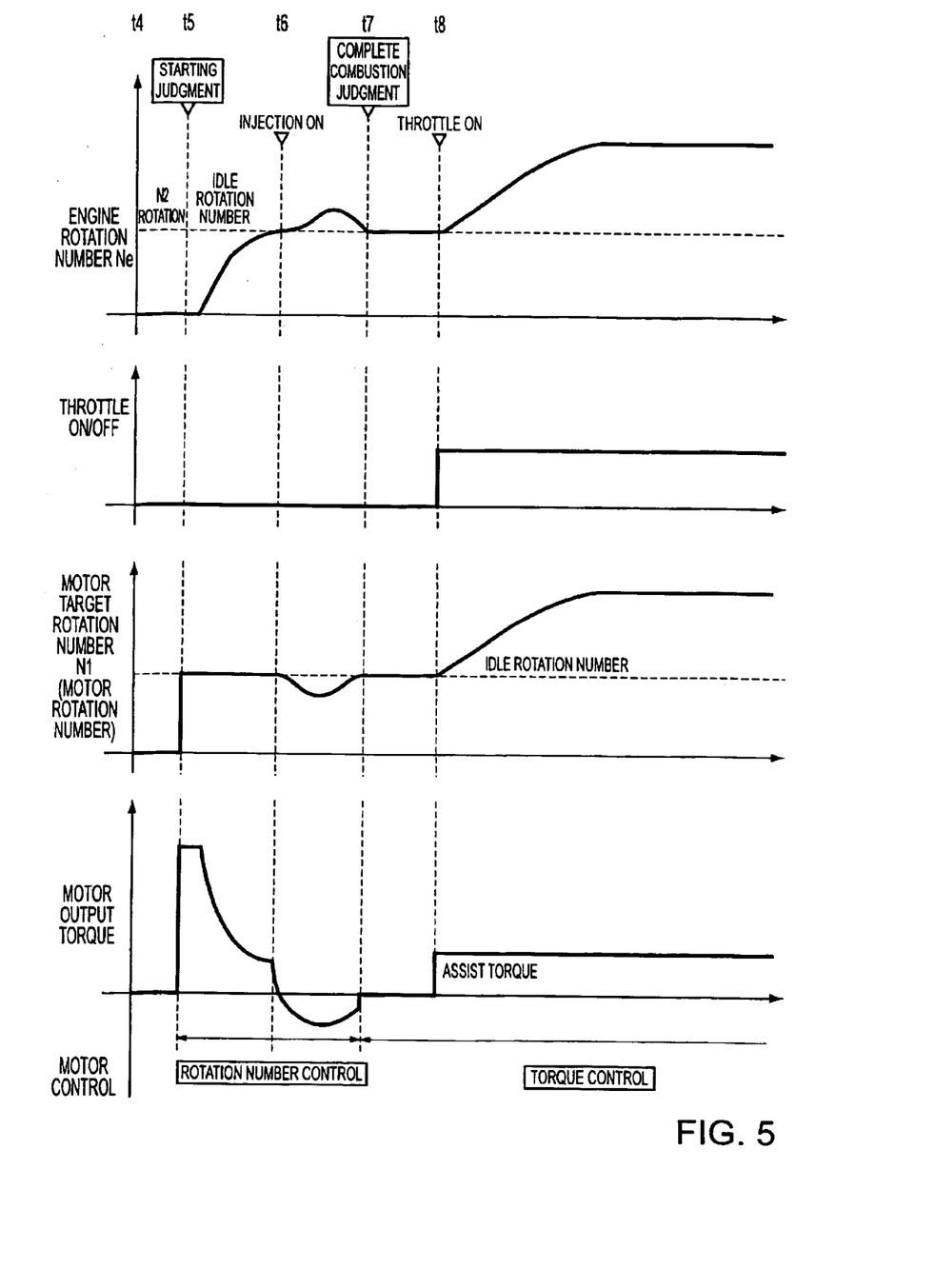
FIG. 5 is a time chart showing the case of an ordinary temperature time of the engine water.

Next, is an explanation of the case of the ordinary temperature time in which the engine water temperature is, e.g., about 60° C. As shown in FIG. 5, the idle stop (engine stop) exists at time point t4. For example, when the brake is released (throttle is off) at a time point t5 and the engine starting condition is judged by the starting condition judging means 50 (starting judgment in step S2), the water temperature of the engine 2 is obtained by the engine water temperature detecting means 61, and the throttle aperture θd is obtained by the request torque detecting means 40 (S3). Because the water temperature of the engine 2 is about 60° C. and the throttle aperture θd is 0% (OFF), the motor target rotation number N1 is set to the idle rotation number by the rotation number control means 21 on the basis of line d of the target rotation number map map 1, shown in FIG. 7, and the rotation number of the motor 3 is controlled (S4, S5). The engine ignition rotation number N2 is also set to the idle rotation number by the ignition condition setting means 70 on the basis of line D of the ignition rotation number map map2, shown in FIG. 7, (S6).

When the motor 3 is thus driven, using the rotation number control, by means of the rotation number control means 21 at the time interval from the time point t5 to a time point t6, the vehicle is advanced and the engine 2 is rotated so that the engine rotation number Ne is raised to the idle rotation number. The motor 3 initially outputs the maximum output torque during this time such that the rotation number of the motor 3 becomes the target rotation number N1. Thereafter, the output torque of the motor 3 is gradually lowered. However, because the engine 2 is not started, the motor 3 outputs torque for rotating the engine 2 at the target rotation number N1 (here the idle rotation number), which is a so-called dragging torque amount and a torque amount for creep-running the vehicle at the time point t6.

When the engine rotation number Ne becomes the idle rotation number at time point t6, the engine rotation number Ne reaches the engine ignition rotation number N2 set to the idle rotation number. Accordingly, the engine ignition condition is judged by the ignition condition judging means 80 (S7). Thus, while the rotation number control of the motor 3 is continued by the rotation number control means 21 (S8, S9), the injection is turned on by the engine ignition means 32 (S10) so that the engine 2 is ignited and started. The engine rotation number Ne thus begins to be raised by igniting the engine 2 at the time interval from the time point t6 to a time point t7. However, as mentioned above, the operation of the motor 3 is controlled by the rotation number control means 21 such that the target rotation number N1 is lowered by calculating the deviation of the raising engine rotation number Ne and the rotation numbers of the engine 2 and the motor 3 are converged to the initial target rotation number N1. The output torque of the motor 3 is lowered in a manner in which the output torque caused by the ignition of the engine 2 is absorbed.

Thereafter, when the engine 2 is completely combusted at the time point t7 (complete combustion judgment in step S11), the motor 3 attains the state of torque control using the torque control means 22 (S12). However, because the idle rotation number is maintained by the engine 2 and the torque is outputted from the engine 2, motor 3 outputs no torque and the vehicle attains the state of creep running using the engine 2. When the throttle is turned on at a time point t8, assist torque is outputted from the motor 3 as a controlled torque and the engine 2 also outputs torque according to the throttle aperture θd. Thus, the engine rotation number Ne and the motor rotation number are raised so that the vehicle accelerates.

Figure 6:
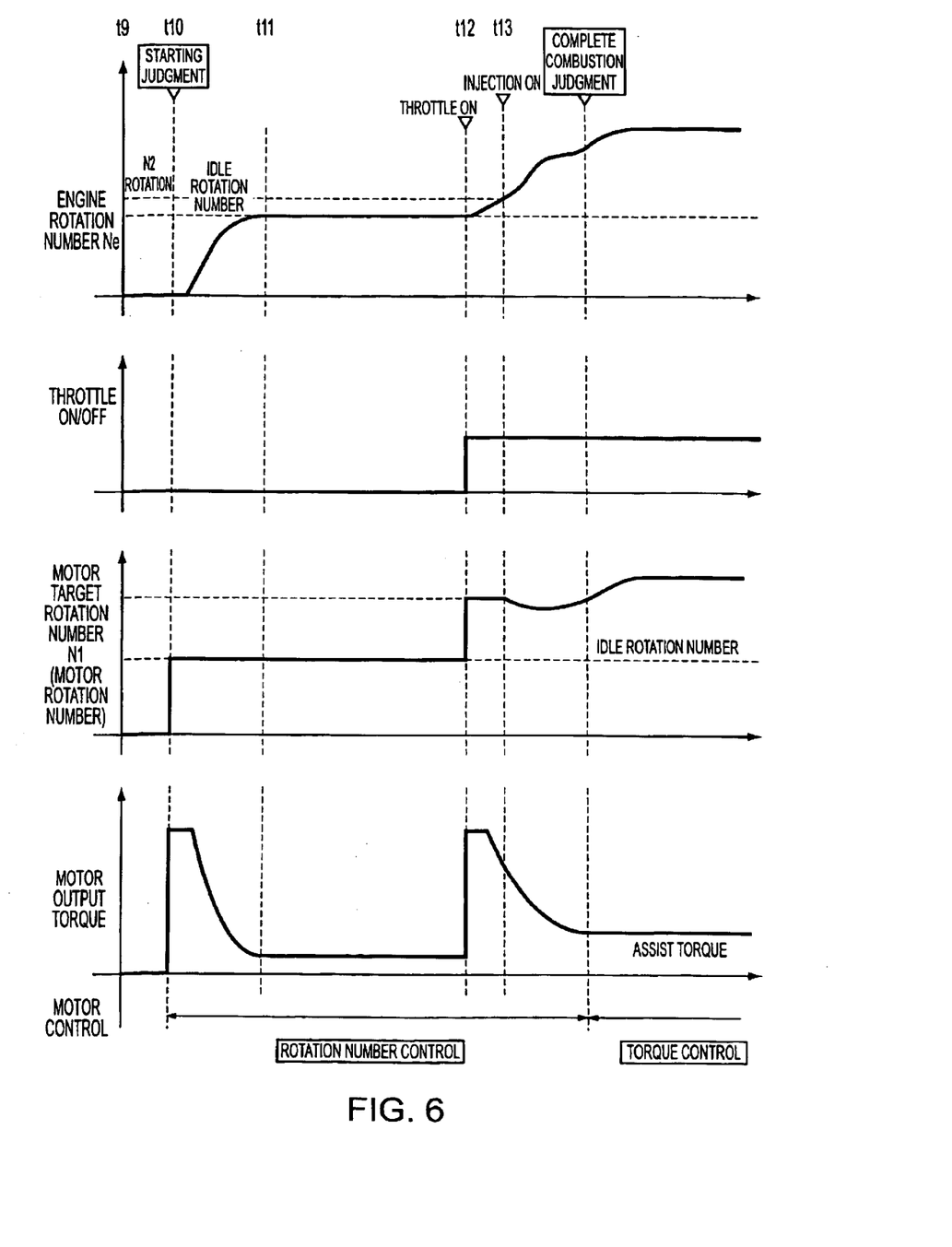
FIG. 6 is a time chart showing the case of a high temperature time of the engine water.

An explanation will now be made of the high temperature time in which the engine water temperature is, e.g., about 80° C. As shown in FIG. 6, the idle stop (engine stop) occurs at a time point t9. For example, when the brake is released (throttle is turned off) at a time point t10 and the engine starting condition is judged by the starting condition judging means 50 (starting judgment in step S2), the water temperature of the engine 2 is obtained by the engine water temperature detecting means 61 and the throttle aperture θd is obtained by the request torque detecting means 40 (S3). Because the water temperature of the engine 2 is about 80° C. and the throttle aperture θd is 0% (OFF), the motor target rotation number N1 is set to the idle rotation number by the rotation number control means 21 on the basis of line e of the target rotation number map map1, shown in FIG. 7, and the rotation number of the motor 3 is controlled (S4, S5). Further, the engine ignition rotation number N2 is set to a rotation number slightly higher than the idle rotation number by the ignition condition setting means 70 on the basis of line E of the ignition rotation number map map2, shown in FIG. 7, (S6).

When the motor 3 is thus driven by the rotation number control by means of the rotation number control means 21 at the time interval from the time point t10 to a time point t11, the vehicle is advanced and the engine 2 is rotated so that the engine rotation number Ne is raised until it reaches the idle rotation number. The motor 3 initially outputs the maximum output torque during this time such that the rotation number of the motor 3 becomes the target rotation number N1. Thereafter, the output torque of the motor 3 is gradually lowered, but the engine 2 is not started. Therefore, at the time point t11, the motor 3 outputs the torque for rotating the engine 2 at the target rotation number N1 (here idle rotation number), a so-called dragging torque amount (also including a torque amount for running the vehicle during the creep running of the vehicle).

At the time point t11, the motor 3 reaches the idle rotation number as the target rotation number N1 so that the engine rotation number Ne also becomes the idle rotation number. However, engine 2 is not started as the engine ignition rotation number N2 is set-to a rotation number higher than the idle rotation number. Thereafter, the vehicle attains the state of the creep running by the output torque of the motor 3 at the time interval from the time point t11 to a time point t12. Because engine 2 is not started during this time, the motor 3 outputs the dragging torque amount and the torque amount for performing the creep running.

Thereafter, when the throttle is turned on at the time point t12, the target rotation number N1 (a target rotation number higher than the idle rotation number set at the time points t10 to t12) according to the throttle aperture θd is set by the rotation number control means 21 on the basis of line e of the target rotation number map map1, shown in FIG. 7, and the rotation number of the motor 3 is controlled (S4, S5). As the rotation number of the motor 3 is raised so as to become the target rotation number N1 at the time interval from the time point t12 to a time point t13, the engine rotation number Ne is raised. Because the engine rotation number Ne reaches the set engine ignition rotation number N2 at the time point t13, the engine ignition condition is judged by the ignition condition judging means 80 (S7). Thus, while the rotation number control of the motor 3 is continued by the rotation number control means 21 (S8, S9), the injection is turned on by the engine ignition means 32 (S10) and the engine 2 is ignited, i.e., started-up.

Because the engine 2 is thus ignited at the time interval from the time point t13 to a time point t14, the engine rotation number Ne is further raised. However, as mentioned above, the operation of the motor 3 is controlled by the rotation number control means 21 such that the target rotation number N1 is lowered by calculating the deviation of the raising engine rotation number Ne and the rotation numbers of the engine 2 and the motor 3 are converged to the original target rotation number N1.

Thereafter, when the engine 2 is completely combusted at the time point t14 (complete combustion judgment in step S11), the motor 3 attains the state of torque control using the torque control means 22 (S12). Because the throttle is turned on, assist torque is outputted from the motor 3, controlled in torque, and the engine 2 outputs torque according to the throttle aperture θd. Thus, the engine rotation number Ne and the motor rotation number are raised so that the vehicle is accelerated.

As mentioned above, in accordance with the controller 1 of the vehicle in the invention, the load condition detecting means 60 detects the water temperature of the engine 2 as a load condition, and the ignition condition setting means 70 sets the ignition rotation number N2 to a low value on the basis of the water temperature of the engine 2 when the load torque given to the motor 3 is large, i.e., when the water temperature of the engine 2 is low. The ignition condition setting means 70 sets the ignition rotation number N2 to a high value when the load torque given to the motor 3 is small, i.e., when the water temperature of the engine 2 is high. The ignition condition judging means 80 judges that the engine rotation number Ne reaches the ignition rotation number N2, and the engine ignition means 32 ignites the engine 2. Accordingly, it is possible to set timing for igniting the engine 2 in accordance with the water temperature of the engine 2 (in accordance with the magnitude of the load torque given to the motor 3). Namely, when the load torque given to the motor 3 at the advancing time is increased, the engine 2 is ignited by low speed rotation so that an increase in power consumption can be prevented. Thus, fuel cost can be improved. Further, when the load torque given to the motor 3 is small, the engine 2 is ignited by high speed rotation so that emissions can be improved.

Further, when the load torque given to the motor 3 is large, the ignition rotation number N2 of the engine 2 is set low as mentioned above and the engine 2 is started early. Therefore, the torque is outputted from the engine 2 and the output torque of the motor 3 can be restrained. Thus, the rotation number control means 21 can set the target rotation number N1 to a low value so that power consumption can be restrained.

Further, the ignition condition setting means 70 sets the ignition rotation number N2 on the basis of the throttle aperture θd as well as the water temperature of the engine 2. Accordingly, the timing for igniting the engine 2 can also be set in accordance with the magnitude of the load torque, which is affected by the throttle aperture θd given to the motor 3. Further, emissions and fuel cost can be improved.

The load condition detecting means 60 detects the temperature of the lubricating oil of the automatic speed change gear 10 as the load condition. The ignition condition setting means 70 sets the ignition condition on the basis of the temperature of the lubricating oil of the automatic speed change gear 10. Thus, the timing for igniting the engine 2 can also be set in accordance with the magnitude of the load torque, which is affected by the temperature of the lubricating oil of the automatic speed change gear 10, given to the motor 3. In this case, the ignition rotation number N2 can also be similarly set on the basis of the throttle aperture θd.

Further, the ignition condition correcting means 90 corrects the ignition rotation number N2 on the basis of the remaining charge amount SOC of the battery 13. Accordingly, the ignition timing of the engine 2 can be changed in accordance with the remaining charge amount SOC. Namely, when the remaining charge amount SOC is large, electric power is consumed by delaying the ignition, or start-up, timing of the engine 2. In contrast to this, when the remaining charge amount SOC is small, the ignition timing of the engine 2 is hastened. Thus, the consumption of the electric power can be restrained.

Further, the ignition condition correcting means 90 corrects the ignition rotation number N2 on the basis of the performance state SOH of the battery 13. Accordingly, the ignition timing of the engine 2 can be changed in accordance with the performance state SOH. Namely, when the performance state SOH is bad, the ignition timing of the engine 2 is hastened so that a reduction in voltage can be prevented.

In addition, because the ignition condition correcting means 90 corrects the ignition rotation number N2 on the basis of the temperature of the battery 13, the ignition timing of the engine 2 can be changed in accordance with the temperature of the battery 13. Namely, when the temperature of the battery 13 is low, the ignition timing of the engine 2 is hastened and power consumption is restrained so that voltage drop can be prevented. Further, the temperature of the battery 13 can be detected by detecting the external air temperature of the vehicle.

In the above embodiment of the invention, the water temperature of the engine 2 and the temperature of the lubricating oil of the automatic speed change gear 10 are detected as load conditions and are used as parameters having an influence on the magnitude of the load torque given to the motor 3. However, the load conditions are not limited to these parameters. For example, the temperature of the engine oil, etc. may be also used as a parameter for the load conditions. Any parameter can be used for the load condition if the parameter has an influence on the magnitude of the load torque given to the motor 3 at the advancing time.

Further, in the explanation of this embodiment, the ignition condition (ignition rotation number N2) is set on the basis of the water temperature of the engine 2 and the temperature of the lubricating oil of the automatic speed change gear 10. However, the invention is not limited to this case. For example, the ignition condition is set on the basis of the water temperature of the engine 2 and may be corrected by the temperature of the lubricating oil of the automatic speed change gear 10. Otherwise, the ignition condition is set on the basis of the temperature of the lubricating oil of the automatic speed change gear 10 and may be corrected by the water temperature of the engine 2.

Further, in this embodiment, the ignition condition correcting means 90 corrects the ignition rotation number N2 (ignition condition) with the remaining charge amount SOC of the battery 13, the performance state SOH of the battery 13 and the temperature of the battery 13 as conditions. However, the invention is not so limited. For example, a slope descending path, a slope ascending path, atmospheric pressure, etc. may be also set as conditions. If it is necessary to correct the ignition rotation number N2, the correction may be also made in any condition.

Further, in the explanation of this embodiment, the external air temperature is detected by the external air thermometer 11 and the temperature of the battery 13 is detected on the basis of the external air temperature. However, the temperature of the battery 13 may be also detected by arranging a temperature sensor within the battery 13.

What is claimed is:

1. A controller of a vehicle comprising an engine for outputting driving rotation by a crank shaft, a motor connected to the crank shaft of the engine, and a battery for supplying electric power to the motor, the controller of the vehicle comprising:

engine stopping means for stopping the operation of the engine at a stopping time of the vehicle;

motor control means for driving the vehicle and rotating the engine by controlling the driving of the motor at a starting time of the vehicle;

load condition detecting means for detecting a load condition having an influence on the magnitude of load torque given to the motor during the stoppage of the engine when the vehicle is started by the motor;

ignition condition setting means for setting an ignition condition for starting the engine on the basis of the load condition detected by the load condition detecting means;

ignition condition judging means for judging that the ignition condition set by the ignition condition setting means is satisfied; and engine ignition means for starting-up the engine on the basis of the judging result of the ignition condition judging means.

2. The controller of the vehicle according to claim 1, the controller further comprising rotation number detecting means for detecting the rotation number of the engine, wherein the ignition condition setting means sets an ignition starting rotation number of the engine as the ignition condition on the basis of the load condition, and the ignition condition judging means judges that the ignition condition is satisfied when the rotation number of the engine detected by the rotation number detecting means reaches the ignition starting rotation number.

3. The controller of the vehicle according to claim 2, wherein the ignition condition setting means sets a low ignition starting rotation number when the load torque given to the motor on the basis of the load condition is large, and sets a high ignition starting rotation number when the load torque given to the motor on the basis of the load condition is small.

4. The controller of the vehicle according to claim 3, wherein the motor control means has rotation number control means for controlling the rotation number of the motor by setting a target rotation number at the starting time of the vehicle, and the rotation number control means sets a low target rotation number when the load torque given to the motor is large.

5. The controller of the vehicle according to claim 1, wherein the engine is a water cooling type engine, and the load condition detecting means has engine water temperature detecting means for detecting the water temperature of the water cooling type engine and detects the water temperature of the water cooling type engine as the load condition, and the ignition condition setting means sets the ignition condition on the basis of the water temperature of the water cooling type engine.

6. The controller of the vehicle according to claim 5, the controller comprising request torque detecting means for detecting a torque requested by a driver, wherein the ignition condition setting means sets the ignition condition on the basis of the water temperature of the water cooling type engine and the requested torque.

7. The controller of the vehicle according to claim 1, wherein the vehicle comprises an automatic speed change gear having a speed changing mechanism lubricated by lubricating oil and changing the speeds of driving rotations of the engine and the motor and outputting the changed speeds to a driving wheel, and the load condition detecting means has lubricating oil temperature detecting means for detecting the temperature of the lubricating oil of the automatic speed change gear, and detects the temperature of the lubricating oil of the automatic speed change gear as the load condition, and the ignition condition setting means sets the ignition condition on the basis of the temperature of the lubricating oil of the automatic speed change gear.

8. The controller of the vehicle according to claim wherein the controller further comprises ignition condition correcting means for correcting the ignition condition set by the ignition condition setting means on the basis of a predetermined condition.

9. The controller of the vehicle according to claim 8, the controller further comprising battery remaining amount detecting means for detecting the remaining charging amount of the battery, and the ignition condition correcting means corrects the ignition condition on the basis of the remaining charging amount of the battery detected by the battery remaining amount detecting means as the predetermined condition.

10. The controller of the vehicle according to claim 8, the controller further comprising battery performance detecting means for detecting a performance state of the battery, and the ignition condition correcting means corrects the ignition condition on the basis of the performance state of the battery detected by the battery performance detecting means as the predetermined condition.

11. The controller of the vehicle according to claim 8, the controller further comprising battery temperature detecting means for detecting the temperature of the battery, and the ignition condition correcting means corrects the ignition condition on the basis of the temperature of the battery detected by the battery temperature detecting means as the predetermined condition.

12. The controller of the vehicle according to claim 11, the controller further comprising external air temperature detecting means for detecting the external air temperature of the vehicle, and the battery temperature detecting means detects the temperature of the battery on the basis of the detection of the external air temperature detecting means.

* * * * *